United States Patent
Svensson et al.

(10) Patent No.: US 10,259,503 B2
(45) Date of Patent: Apr. 16, 2019

(54) SUB-FRAME METHOD AND ARRANGEMENT FOR RETAINING A REAR SECTION OF A SUB-FRAME

(71) Applicant: Ningbo Geely Automobile Research & Development Co., Ltd., Ningbo (CN)

(72) Inventors: Martin Svensson, Kullavik (SE); John-Erik Andersson, Stenungsund (SE); Roger Karlsson, Torslanda (SE); Dan Adamsson, Sävedalen (SE); Johan Leander, Spekeröd (SE); Johan Klingberg, Göteborg (SE); Tom Stoddart, Mölndal (SE)

(73) Assignee: Ningbo Geely Automobile Research & Development Co., Ltd., Ningbo (CN)

( * ) Notice: Subject to any disclaimer, the term of this patent is extended or adjusted under 35 U.S.C. 154(b) by 0 days.

(21) Appl. No.: 15/727,834

(22) Filed: Oct. 9, 2017

(65) Prior Publication Data
US 2018/0086385 A1    Mar. 29, 2018

Related U.S. Application Data

(63) Continuation of application No. PCT/SE2016/050369, filed on Apr. 26, 2016.

(30) Foreign Application Priority Data

May 19, 2015   (SE) .................... 15506355

(51) Int. Cl.
*B62D 21/15*   (2006.01)
*B62D 27/06*   (2006.01)
*B62D 21/11*   (2006.01)

(52) U.S. Cl.
CPC ............ *B62D 21/155* (2013.01); *B62D 21/11* (2013.01); *B62D 27/065* (2013.01); *B60G 2206/60* (2013.01)

(58) Field of Classification Search
CPC .... B62D 21/15; B62D 21/155; B62D 21/152; B62D 21/11; B62D 27/06; B62D 27/065; B62D 25/082; B60G 2206/60
(Continued)

(56) References Cited

U.S. PATENT DOCUMENTS 9,616,932 B2 *   4/2017   Nusier ................ B62D 21/155
2006/0181071 A1 *   8/2006   Mitsui ................ B62D 21/155
                                                                280/784
(Continued)

FOREIGN PATENT DOCUMENTS

EP       2985208 A1    7/2016
WO    WO20140167902 A1   10/2014

OTHER PUBLICATIONS

The PCT Notification of Transmittal of the International Preliminary Report on Patentability dated Aug. 5, 2017 for PCT application No. PCT/SE2016/050369, 13 pages.

(Continued)

*Primary Examiner* — Keith J Frisby
(74) *Attorney, Agent, or Firm* — Lee & Hayes, P.C.

(57) ABSTRACT

A sub-frame arrangement (1) in a vehicle and method thereof wherein the sub-frame arrangement comprises a sub-frame (2), a first body member, and rear attachment means for attaching said sub-frame to the first body member. The sub-frame is a dual part sub-frame comprising a lower sheet section (2b) formed in a single piece wherein said lower sheet section extends the entire length of said sub-frame. The lower sheet section is further formed with two rear portions (21) each extending backwards in the travel direction of said vehicle and the rear portions are adapted to host the rear attachment means.

13 Claims, 9 Drawing Sheets

(58) Field of Classification Search
USPC ......... 280/124.109, 784; 296/187.09, 193.09
See application file for complete search history.

(56) References Cited

U.S. PATENT DOCUMENTS

2010/0102543 A1  4/2010  Kang
2011/0198889 A1  8/2011  Takeshita et al.

OTHER PUBLICATIONS

The PCT Search Report dated Jul. 7, 2016 for PCT application No. PCT/SE2016/050369, 11 pages.

* cited by examiner

SUB-FRAME METHOD AND ARRANGEMENT FOR RETAINING A REAR SECTION OF A SUB-FRAME

RELATED APPLICATION

This application is a continuation of PCT International Application No. PCT/SE2016/050369, filed Apr. 26, 2016, which claims foreign priority to Sweden Application No. 1550635-5, filed on May 19, 2015, both of which are incorporated herein by reference.

TECHNICAL FIELD

The present invention relates generally to a sub-frame arrangement for retaining a rear section of a sub-frame in a vehicle.

BACKGROUND ART

In prior art it is known to produce sub-frame arrangements comprising means for releasing a sub-frame in order to direct the sub-frame arrangement underneath a passenger cell of a vehicle. There are multiple different solutions available in prior art describing methods and devices for detaching a sub-frame, such as pyrotechnical and mechanical solutions. The sub-frame arrangements of the prior art are generally adapted to cope with front collisions and releasing the sub-frame with a purpose of prolonging the deformation distance without the risk of pressing the engine and powertrain into the passenger compartment. However, while it is beneficial to prolong the deformation distance during normal front collisions such solutions reduces the amount of force that a vehicle structure/chassis/body absorb during a small offset collision.

In prior art it is further known to enhance the deformation performance of sub-frames through arranging releasing mechanisms that are adapted to both absorb part of the collision force and eventually give way releasing the sub-frame. This creates an uncontrolled deformation and path for the sub-frame, especially after the complete decoupling from the vehicle body.

It would thereby be beneficial to provide a solution without at least some of the drawbacks of the prior art solutions.

SUMMARY OF INVENTION

An object of the present invention is to provide a solution wherein the production price of a conventional sub-frame is decreased or maintained while additional features are include. Another object is to provide a safety improvement to sub-frame arrangements, especially during small offset collisions.

Thus, the invention relates to a sub-frame arrangement in a vehicle, wherein said sub-frame arrangement comprises a sub-frame, a first body member, and rear fastening means for attaching said sub-frame to the first body member. The sub-frame is a dual part sub-frame comprising a top section and a lower sheet section, wherein said lower sheet section is formed in a single piece and extends the entire length of said sub-frame. The lower sheet section is further formed with two rear portions each extending backwards in the travel direction of said vehicle and adapted to deform during a collision, wherein the rear portions are adapted to host the rear fastening means.

It is one advantage with the present solution that the sub-frame is a dual part sub-frame which decreases production cost and enables that the material consumption is kept to a minimum. It is further more beneficial that the lower sheet section is in one piece for enhancing safety properties during deformation caused by a collision.

The rear portions arranged in the lower sheet section allows for the sub-frame to deform in a novel way that enhance the deformation properties of the sub-frame arrangement and the safety of the vehicle wherein the sub-frame arrangement is arranged.

It is further one advantage with the present solution that the lower sheet section of the sub-frame extends the entire length of the sub-frame. Through extending the entire length the sub-frame can absorb the forces from collisions without additional components and the lower sheet section helps the rear fastening means to secure the sub-frame in place firmly.

According to one embodiment of the sub-frame arrangement, the dual part sub-frame further comprises a top section comprising two towers.

It is one advantage with the present solution that the sub-frame arrangement further comprises a top section that constitutes the second part of the sub-frame. The top section comprises geometrical shapes that are more difficult to produce than the lower sheet section and it is thereby one advantage with the present solution that those features are collectively arranged in one production part of the sub-frame.

According to one embodiment of the sub-frame arrangement the top section is constituted of at least two parts.

It is one advantage with the present solution that the top section according to one embodiment comprises multiple parts while the lower sheet section merely comprises one part. From a production perspective is the sub-frame according to the present solution cost effective to produce.

According to one embodiment of the sub-frame arrangement, the rear portions are adapted to deform in a direction downwards and backwards in relation to the travel direction of the vehicle during a collision, allowing the sub-frame to be directed under a passenger cell of the vehicle.

It is one advantage with the present solution that the lower sheet section comprises rear portions that are adapted to deform in a controlled manner directing the sub-frame under the passenger cell. The controlled deformation enables that the collision force is absorbed during the deformation, the sub-frame arrangement is moved in a controlled direction and the overall safety of the vehicle is thereby improved.

According to one embodiment of the sub-frame arrangement the rear portions are adapted to deform and the rear fastening means adapted to retain an engagement between the rear section of the sub-frame and the first body member during deformation caused by a collision.

It is further an advantage with the present solution that the rear portions both are adapted to deform and retain an engagement. This has the effect that although the rear portions of the lower sheet section deforms in a direction backwards relating to the travel direction of the vehicle the sub-frame maintains in engagement with the rest of the body throughout the entire collision and deformation sequence. As previously mentioned the deformation allows for absorption of force through extending the deformation distance during a collision and through the deformation of the rear portions as such. The present solution further enhance the safety effect reached by such a solution by retaining an engagement between the rear section of the sub-frame and the body members hindering the sub-frame arrangement to completely detach from the vehicle. It is further more advantageous to maintain the engagement with the rear fastening means in order to prevent the engine and other parts located in an engine compartment of a vehicle from entering the passenger cell and/or damage the structure thereof.

It is furthermore one advantage with one embodiment of the present solution that the front section of the sub-frame is released. This enables for a sufficient amount of load to transfer to the rear portions of the sub-frame allowing it to deform in a controlled manner.

Through retaining the rear fastening means engagement between the sub-frame and the body during deformation it is possible to control the deformation of the sub-frame and how at least parts of the power train behaves during a deformation. It is further more advantageous that the lower sheet section extends the entire length of the sub-frame since this produces a sub-frame that is rigid and can be used to absorb additional force. For example, in one embodiment may the rear portions be deformed until instead of allowing deformation the further deformation is retained through hindering the sub-frame from moving further backwards in relation to the vehicle's direction of travel.

According to one embodiment of the sub-frame arrangement is the sub-frame arrangement adapted to enable the deformation distance to increase during a front collision by directing the sub-frame under the passenger cell and the sub-frame arrangement is further adapted to maintain the deformation distance substantially unaffected during a small offset collision. This has the effect that the sub-frame detaches from the vehicle during all forms of major front collisions independent of the amount of collision area. One of the main challenges with enhancing the safety of vehicles are to cope with small offset collisions wherein only a fraction of the vehicle's force absorption surface is affected by the collision. Through retaining the rear section of the sub-frame in engagement with the body, while still allowing for deformation, the engine rotates out of the way during a small offset collision while the structural integrity of the sub-frame helps to absorb the collision force from the small offset collision.

One advantage with the two rear portions of the lower sheet section of the sub-frame is that the deformation distance that is created adapts depending of the type of collision. For example, with a traditional sub-frame arrangement in accordance with prior art wherein the rear section of, or the entire, sub-frame detaches from the vehicle the deformation distance is the same independent of the type of collision.

According to on embodiment of the sub-frame arrangement, the sub-frame arrangement further comprises a release attachment means adapted to release the sub-frame during deformation. The rear fastening means are adapted to not release the sub-frame during said deformation.

It is one advantage with the present solution that in one embodiment is a main bolt arranged on each side of the sub-frame to secure the sub-frame to the vehicle body. However, the release attachment means are in one embodiment adapted to release the sub-frame from engagement during deformation and allowing the sub-frame to only be secured to the vehicle body through the rear fastening means.

According to one embodiment the sub-frame arrangement further comprises a second body member and front fastening means adapted to fasten a front section of said sub-frame to the second body member.

According to one embodiment of the sub-frame arrangement the front fastening means are adapted to release the sub-frame from engagement with the second body member during deformation caused by a collision.

It is one advantage with the present solution that according to one embodiment the front fastening means that attach a front section of the sub-frame to the body members are adapted to completely release the front section of the sub-frame from engagement with the vehicle in order to allow for controlled deformation. This helps directing the sub-frame arrangement in a direction towards the space below the passenger cell.

According to one embodiment of the sub-frame arrangement the lower sheet section has a substantially flat shape formed from a single piece of anyone of sheet metal and aluminum.

It is one advantage with the present solution that the rear portions allows for greater force absorption than during normal release of a sub-frame which has the effect that aluminum can be used without decreasing the ability of the sub-frame to absorb force. This enables that the arrangement in one embodiment is lighter than conventional sub-frame arrangements.

In the context of the sub-frame arrangement, the entire deformation is defined as the deformation occurring until the vehicle has reached a complete stop after the collision.

According to one embodiment of the sub-frame arrangement a first rear portion is adapted to deform different from a second rear portion in order to allow a shorter deformation distance during a moderate overlap collision than during a full front collision.

It is one advantage with the present solution that the different deformation of the rear portions enables a long deformation distance during a full front collision through directing the sub-frame under the passenger cell, and enables a shorter deformation distance during a moderate overlap collision, and thereby enables low passenger cell intrusion during a moderate overlap collision.

According to one embodiment of the sub-frame arrangement at least one of said rear portions are adapted to deform over a second length longer than a first length allowing the rear portion to absorb additional force through limiting the sub-frame movement in the deformation direction.

According to one embodiment is the first length the deformation length until the sub-frame reaches a point interfering with a longitudinal center axis of at least one of the rear fastening means, i.e. corresponding to the distance between the release attachment means and the rear fastening means, and the second length a length longer than said first length. However, the person skilled in the art understands that the first and second lengths can be any lengths within the sub-frame arrangement as long as the first length is shorter than the second length.

According to one aspect of the present invention, there is provided a method in a sub-frame arrangement in a vehicle for partly releasing a sub-frame during a collision, the sub-frame arrangement comprises a sub-frame, a first body member, and rear fastening means for attaching the sub-frame to the first body member. The sub-frame is a dual part sub-frame comprising a top section and a lower sheet section, wherein said lower sheet section is formed in a single piece and extends the entire length of said sub-frame. The lower sheet section further is formed with two rear portions each extending backwards in the travel direction of said vehicle and adapted to deform during a collision. The rear portions are adapted to host the rear fastening means. The method comprises the steps:

deforming the two rear portions backwards relative a travel direction of said vehicle, and retaining engagement between said sub-frame and said first body member.

Accordingly, the sub-frame is directed under a passenger cell of the vehicle when the rear portions deform during a collision.

According to one embodiment are the following steps performed:
- releasing the sub-frame from engagement through a release attachment means,
- deforming the sub-frame over a first length corresponding to the distance between said release attachment means and the rear fastening means, and
- directing the sub-frame under a passenger cell of the vehicle when the rear portions deform during a collision.

According to one embodiment are the following steps performed:
- releasing the sub-frame from fastening means other than the rear fastening means,
- deforming the rear portions over a first length corresponding to the distance between said fastening means and the rear fastening means, and
- directing the sub-frame under a passenger cell of the vehicle when the rear portions deform during a collision.

In one embodiment are the fastening means other than the rear fastening means the front fastening means and at least one other attachment means, preferably a release attachment means. In another embodiment is the other fastening means only the front fastening means. The person skilled in the art understands that the other fastening means might be any form of fastening means except for the rear fastening means.

According to one embodiment the following steps are performed:
- deform at least one of said rear portions over a second length longer than the first length allowing the rear portion to absorb additional force through limiting the sub-frame movement in the deformation direction.

In one embodiment is the first length the length of deformation as shown in FIG. 8, i.e. the deformed length of FIG. 8.

The above described embodiments may be combined or exchanged in any suitable way as long as not contradictory to the overall function of the sub-frame arrangement.

BRIEF DESCRIPTION OF DRAWINGS

The invention is now described, by way of example, with reference to the accompanying drawings, in which.

DESCRIPTION OF EMBODIMENTS

In the following, a detailed description of different embodiments of the sub-frame arrangement is disclosed under reference to the accompanying drawings. All examples herein should be seen as part of the general description and are therefore possible to combine in any way of general terms. Individual features of the various embodiments and aspects may be combined or exchanged unless such combination or exchange is clearly contradictory to the overall function of the disclosed arrangement.

Briefly described the invention relates to a sub-frame arrangement comprising a dual part sub-frame with a lower sheet section that is produced in a single section. The lower sheet section further comprises two rear portions arranged to attach the rear section of the sub-frame to the body of a vehicle. The rear portions are adapted to deform while retaining an engagement with the body members of the vehicle and through all stages of a crash maintain said engagement.

Figure 1:
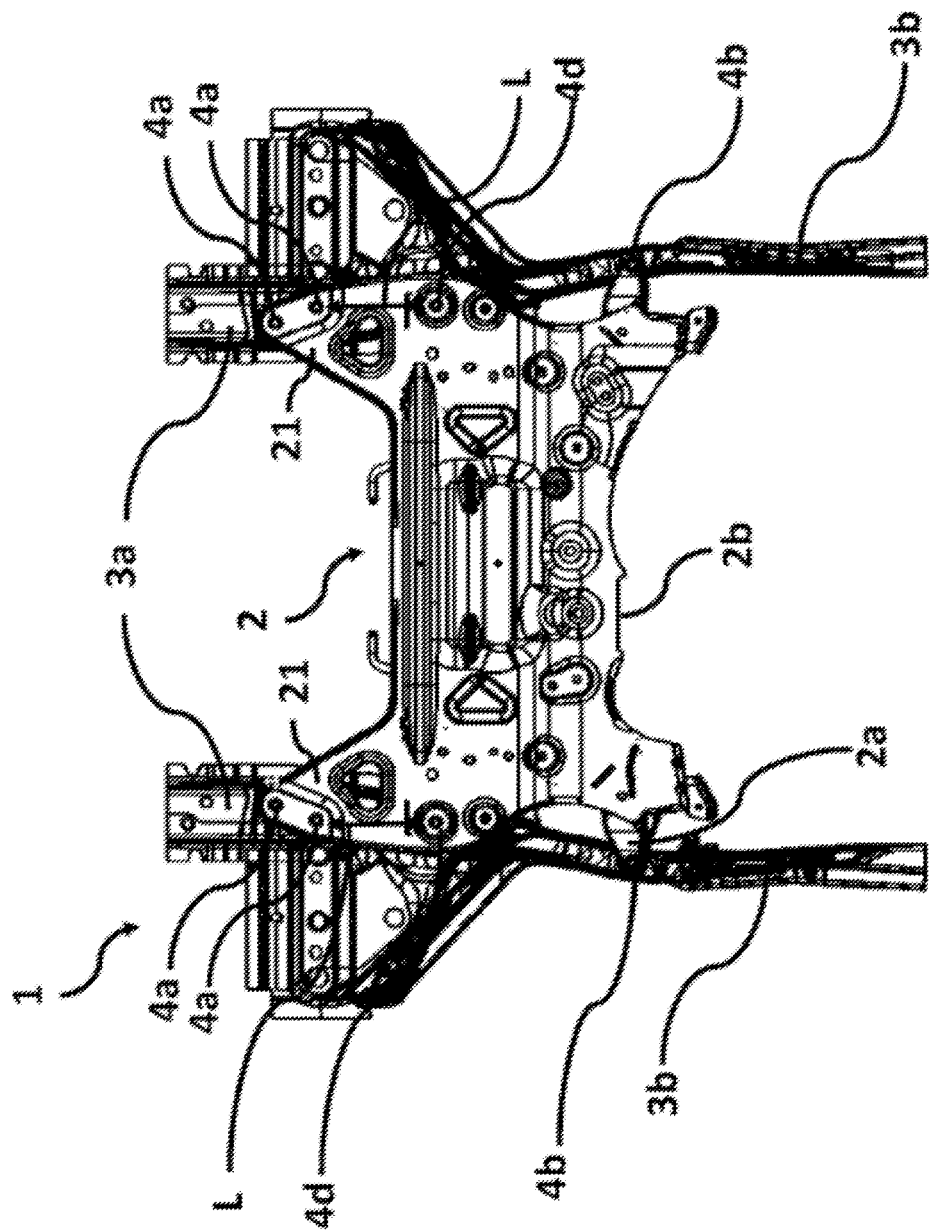
FIG. 1 illustrates one embodiment of a sub-frame arrangement seen from below.

FIG. 1 illustrates one embodiment of the sub-frame arrangement 1 in a vehicle wherein the sub-frame 2 is attached to body members 3a, 3b. The embodiment as shown in FIG. 1 illustrates the sub-frame arrangement 1 during normal conditions where no crash has occurred. The person skilled in the art understands that FIG. 1 only illustrates parts of the components that would be arranged in a vehicle and that the illustration only is one example adapted to illustrate the characteristics of the sub-frame arrangement 1. FIG. 1 further illustrates that the sub-frame 2 is attached with front fastening means 4b and rear fastening means 4a adapted to secure the sub-frame 2 within the sub-frame arrangement 1. The sub-frame 2 is thereby fastened to the body members 3a, 3b of the vehicle body.

The illustration of FIG. 1 shows the sub-frame arrangement 1 from below and thereby also the sub-frame 2 from below. The sub-frame 2 is a dual part sub-frame constituted of two main sections, a top section 2a and a lower sheet section 2b. In FIG. 1 is the lower sheet section 2b clearly visible while only parts of the top section 2a are in view. The remaining parts of the top section 2a are blocked from view by the lower sheet section 2b. However, it should be noted that in one embodiment as illustrated in FIG. 1 are the front fastening means 4b arranged to fasten a front section of the sub-frame 2 through fastening the top section 2a.

FIG. 1 further illustrates the two rear portions 21 that extends backwards from a main body of the lower sheet section 2b of the sub-frame 2. The rear portions 21 hosts the rear fastening means 4a, preferably two on each side of the sub-frame as illustrated in the embodiment of FIG. 1.

In one embodiment as illustrated in FIG. 1 are the front body members 3b extending forward and together constituting part of the engine compartment. However, the person skilled in the art understands that the design and embodiments of the body members may be altered to any form of suitable design within the scope of the solution.

FIG. 1 further illustrates one embodiment wherein a release attachment means 4d adapted to fasten the sub-frame 2 in the sub-frame arrangement 1 and thereby during normal driving conditions keep the sub-frame in fixed engagement within the vehicle. The distance L between the release attachment means 4d and the rear fastening means 4a is in one embodiment selected to determine the deformation direction of the sub-frame 2. I.e. in order to direct the sub-frame 2 under a passenger cell of the vehicle.

Figure 2:
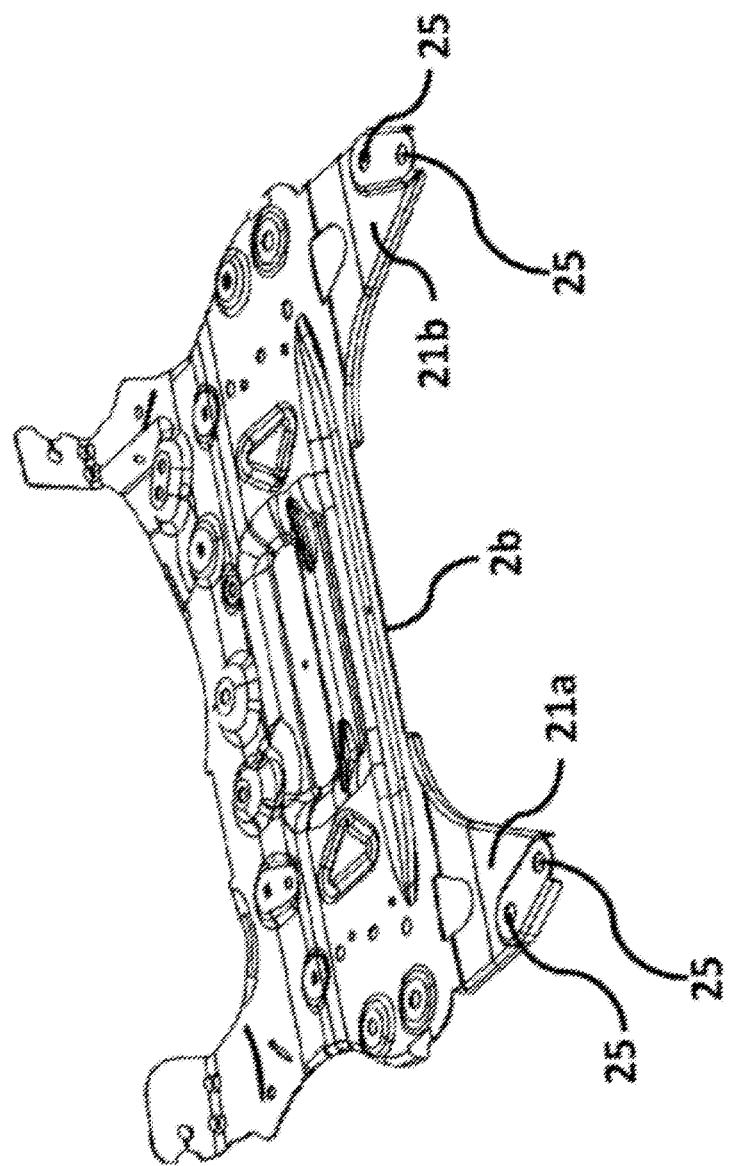
FIG. 2 illustrates one embodiment of lower sheet section adapted to be arranged in a sub-frame arrangement, wherein the lower sheet section is illustrated in an isometric view.

FIG. 2 illustrates one embodiment of the lower sheet section 2b of the sub-frame 2 in detail. The lower sheet section 2b is formed from a single piece and comprises two rear portions that extends backwards in order to create deformation distance for the sub-frame 2 while enabling that the sub-frame 2 is directed underneath a passenger cell in the event of a front collision. The term collision as used herein might refer to any form of crash and it should be noted that similar deformation might occur from other events than a front collision. However, the main scope of the invention is to resolve issues relating to the differences in characteristics between front collisions wherein a large collision area is affected and small offset collisions wherein only a fraction of the front area absorbs the collision force.

FIG. 2 further illustrates that the lower sheet section 2b of the sub-frame 2 might comprise any number of apertures, metal stampings, pressings, or other alterations to the form of the lower sheet section 2b. In one embodiment are at least some of the mentioned machining's to the lower section 2b adapted to enable engagement with the top section 2a.

FIG. 2 further illustrates that the rear portions 21 of the lower sheet section 2b in one embodiment comprises apertures 25 adapted to host the rear fastening means 4a. In a preferred embodiment each rear portion 21 comprises two apertures 25.

Figure 3:
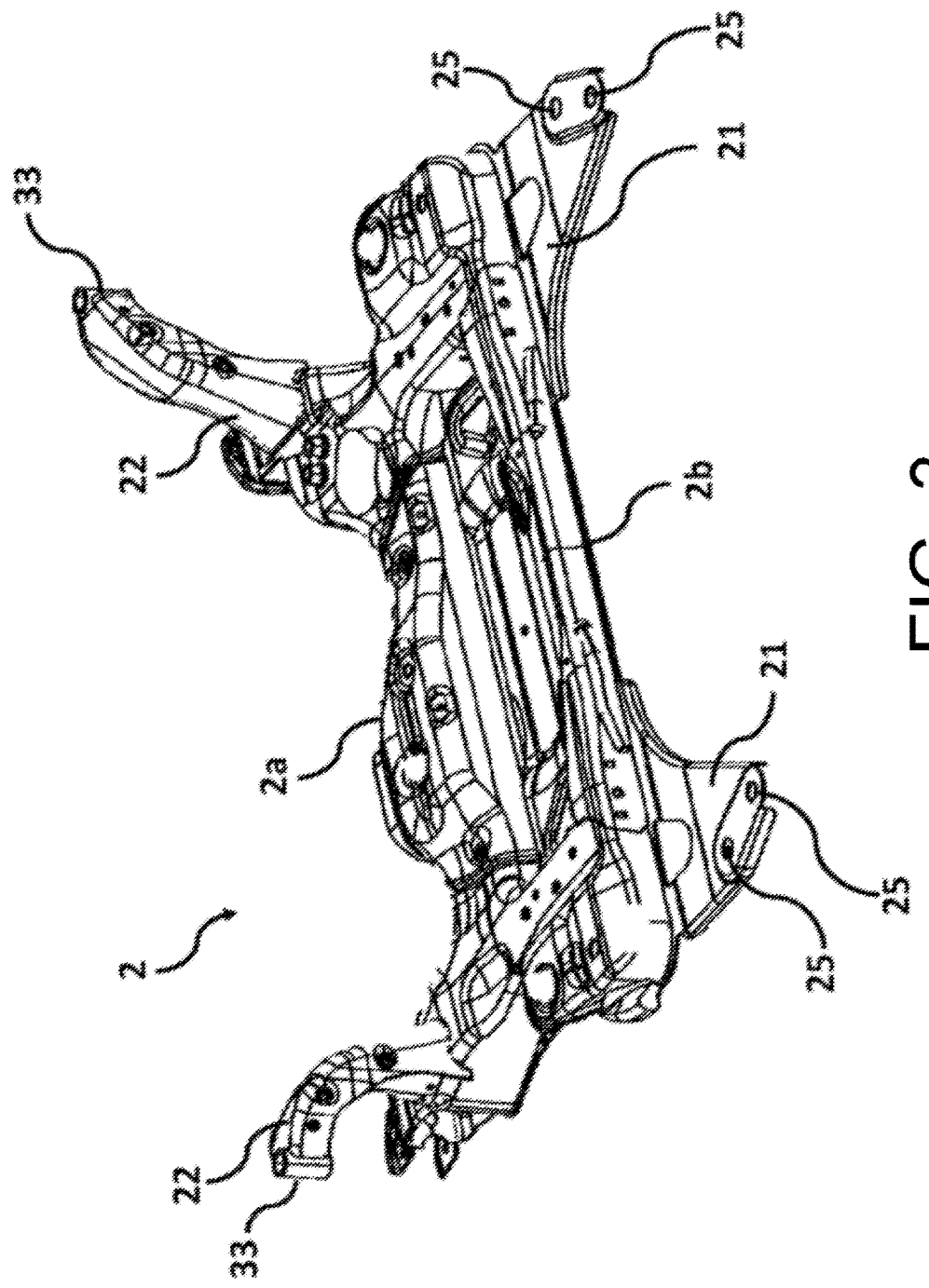
FIG. 3 illustrates one embodiment of the lower sheet section and the top section of the sub-frame arrangement together constituting one embodiment of the sub-frame illustrated in an isomeric view.

FIG. 3 illustrates one embodiment of the assembled sub-frame 2 comprising both the lower sheet section 2b and the top section 2a. FIG. 3 further illustrates one embodiment of the top section 2a comprising two towers 22 extending upwards from the main body of the sub-frame 2. In one embodiment are front attachment sockets 33 arranged at the top of each tower 22 which are adapted to host fastening means 4b.

FIG. 3 further illustrates the two towers 22 which hosts the attachment sockets 33. The attachment socket comprises a weakened portion. The attachment socket 33 comprising a weakened portion is in one embodiment adapted to deform in a way that the weakened portion gives way opening up the attachment socket 33 allowing for the fastening means 4b to be released from the attachment socket 33 and thereby releasing the front section 31 of the subframe 2.

Figure 4:
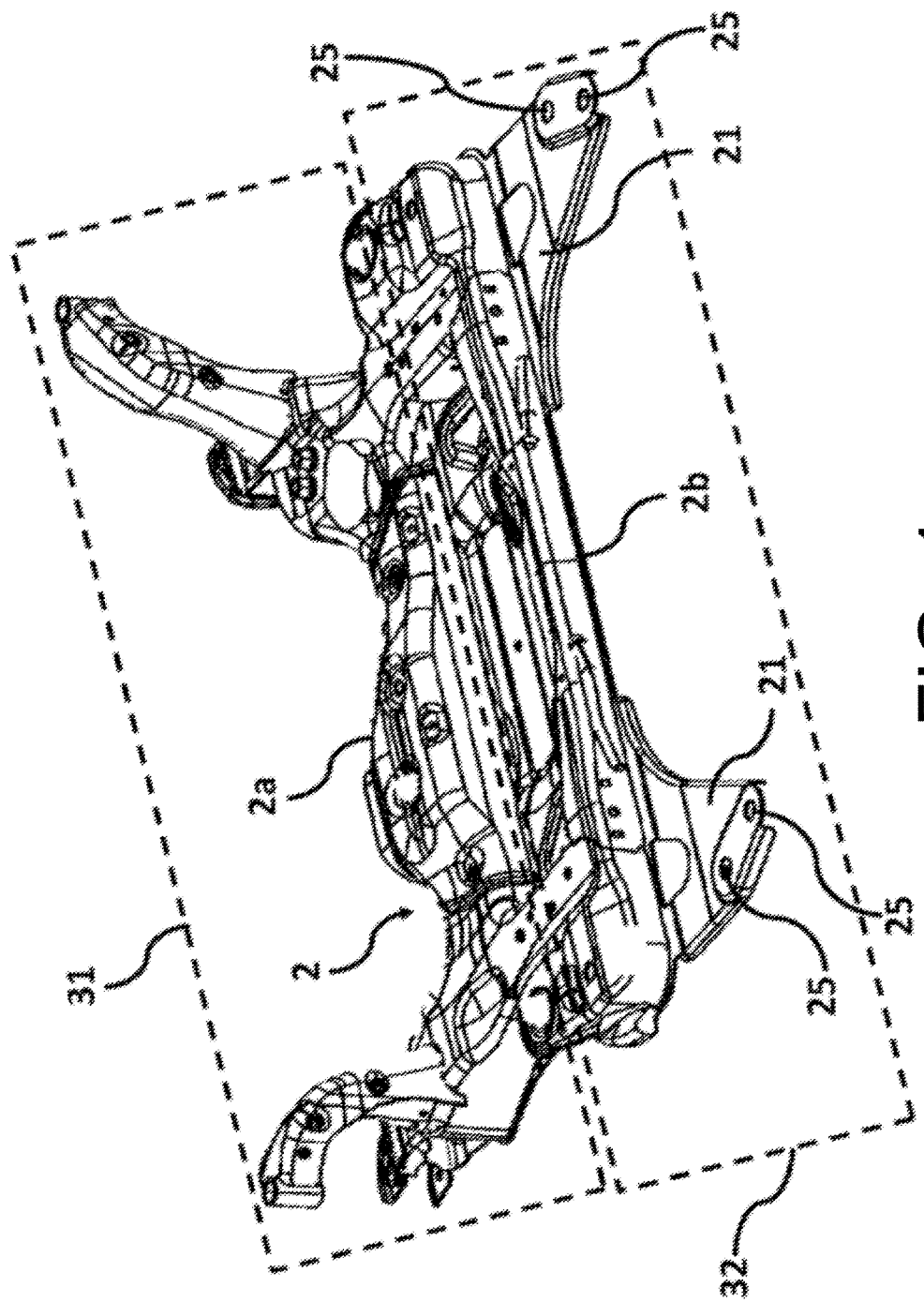
FIG. 4 illustrates one embodiment of sub-frame of the sub-frame arrangement indicating the front section of the sub-frame.

FIG. 4 illustrates one embodiment of the sub-frame 2 wherein the front section 31 and the rear section 32 are illustrated.

Figure 5:
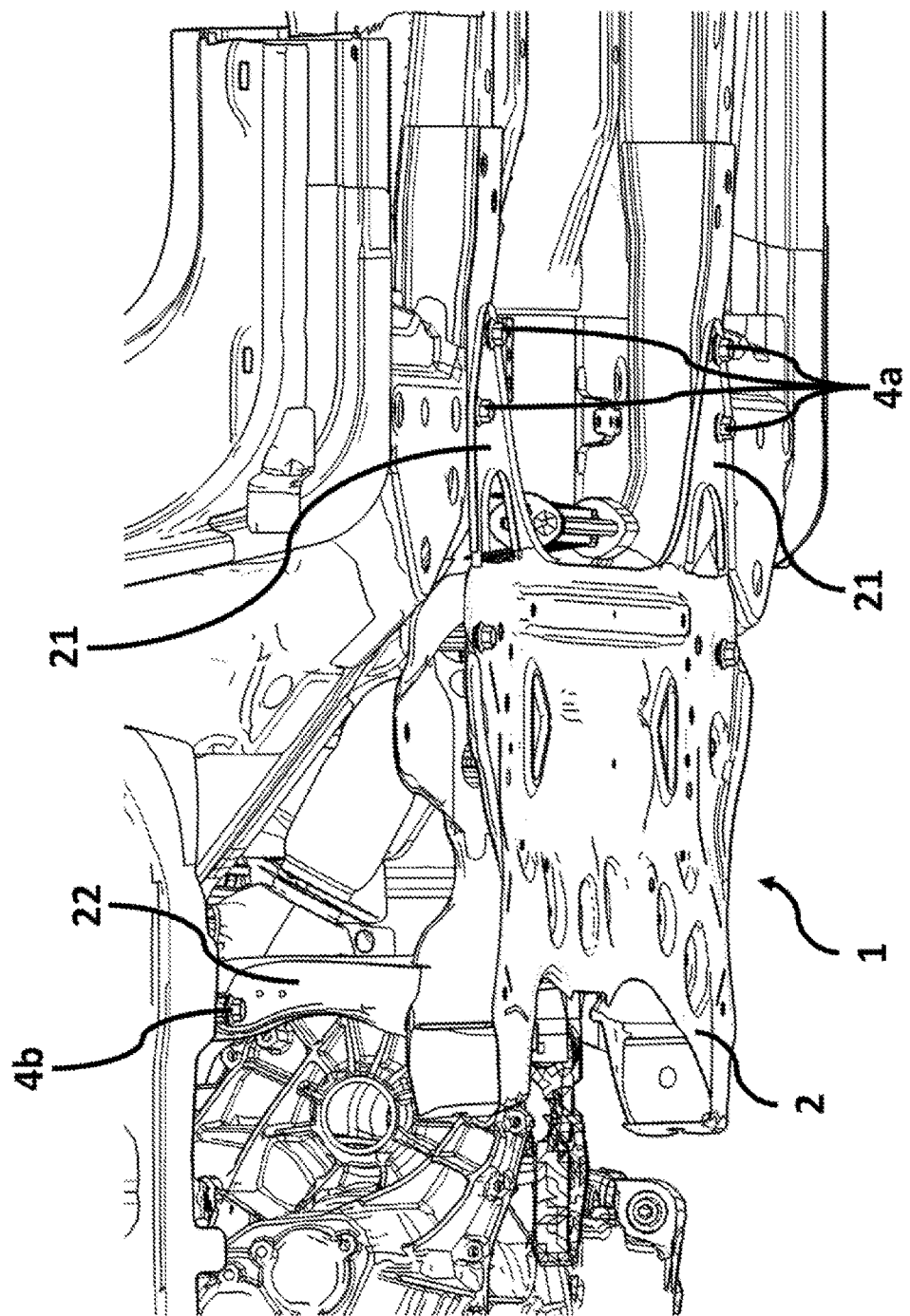
FIG. 5 illustrates one embodiment of the sub-frame arrangement comprising the sub-frame, fastening means, and body members, wherein the arrangement is arranged in a vehicle.

FIG. 5 illustrates one embodiment of the sub-frame arrangement 1 wherein the sub-frame 2 is arranged within a vehicle and additional components of the vehicle are comprised in the illustration. The sub-frame 2 is attached to body members of the vehicle through front fastening means 4b and rear fastening means 4a. In one embodiment are the fastening means 4a, 4b bolts arranged through going through apertures in the sub-frame 2. FIG. 5 further illustrates the sub-frame arrangement 1 in a state wherein no collision or crash has occurred, i.e. during normal driving conditions.

Figure 6:
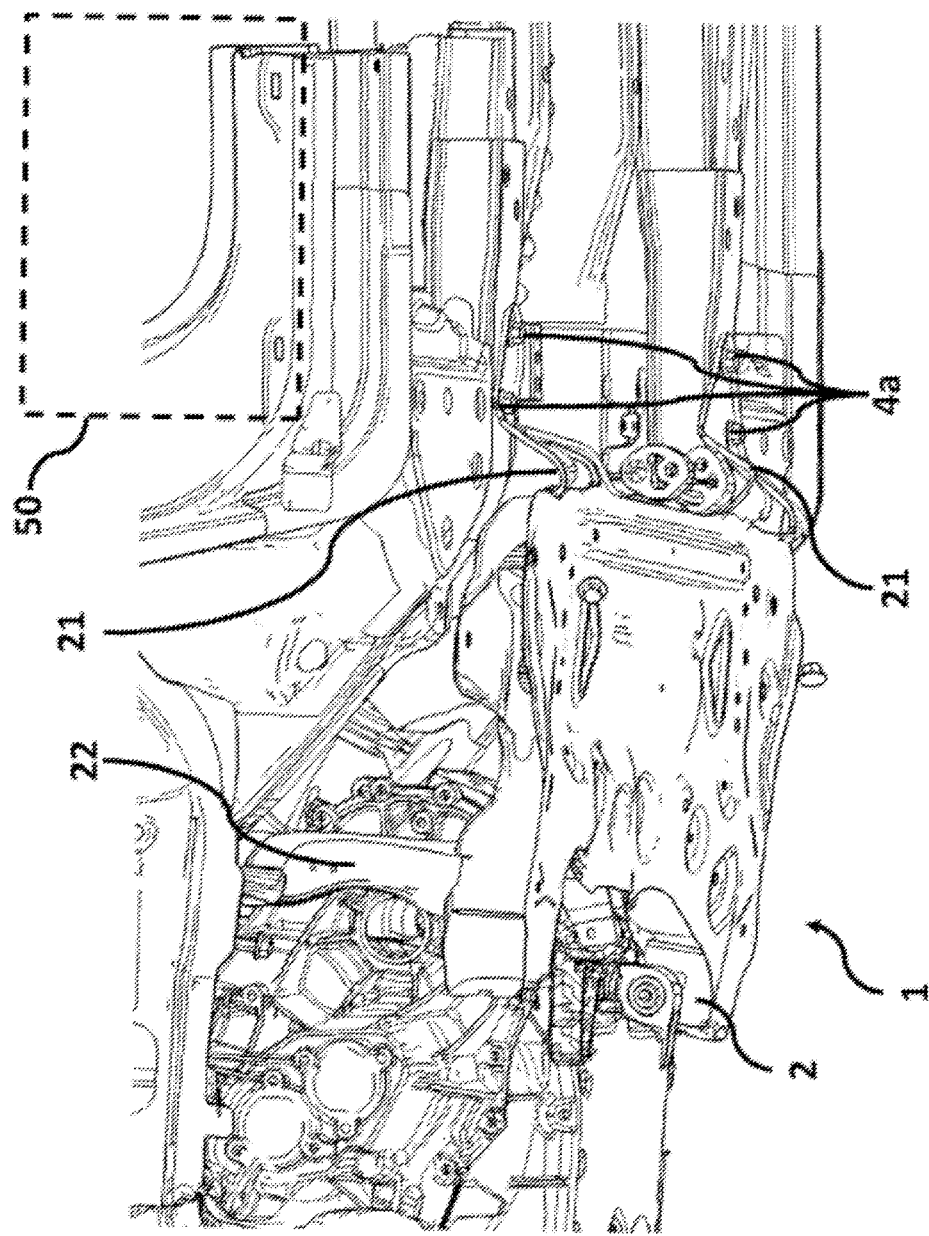
FIG. 6 illustrates one embodiment of the sub-frame arrangement after deformation caused by a collision.

FIG. 6 illustrates one embodiment of the sub-frame arrangement 1 wherein a collision has occurred, or a collision is in progress, wherein the sub-frame 2 thereby has deformed backwards and the rear portions 21 have deformed allowing the sub-frame 2 to be directed in a direction towards the space underneath the passenger cell 50.

In one embodiment is the sub-frame 2 released from the front fastening means 4b during deformation caused by a collision while the rear portions 21 deforms in a direction downwards and backwards in relation to the travel direction of the vehicle. Through the deformation of the rear portions 21 are force absorbed while the sub-frame 2 is directed towards the space underneath the passenger cell 50.

Figure 7:
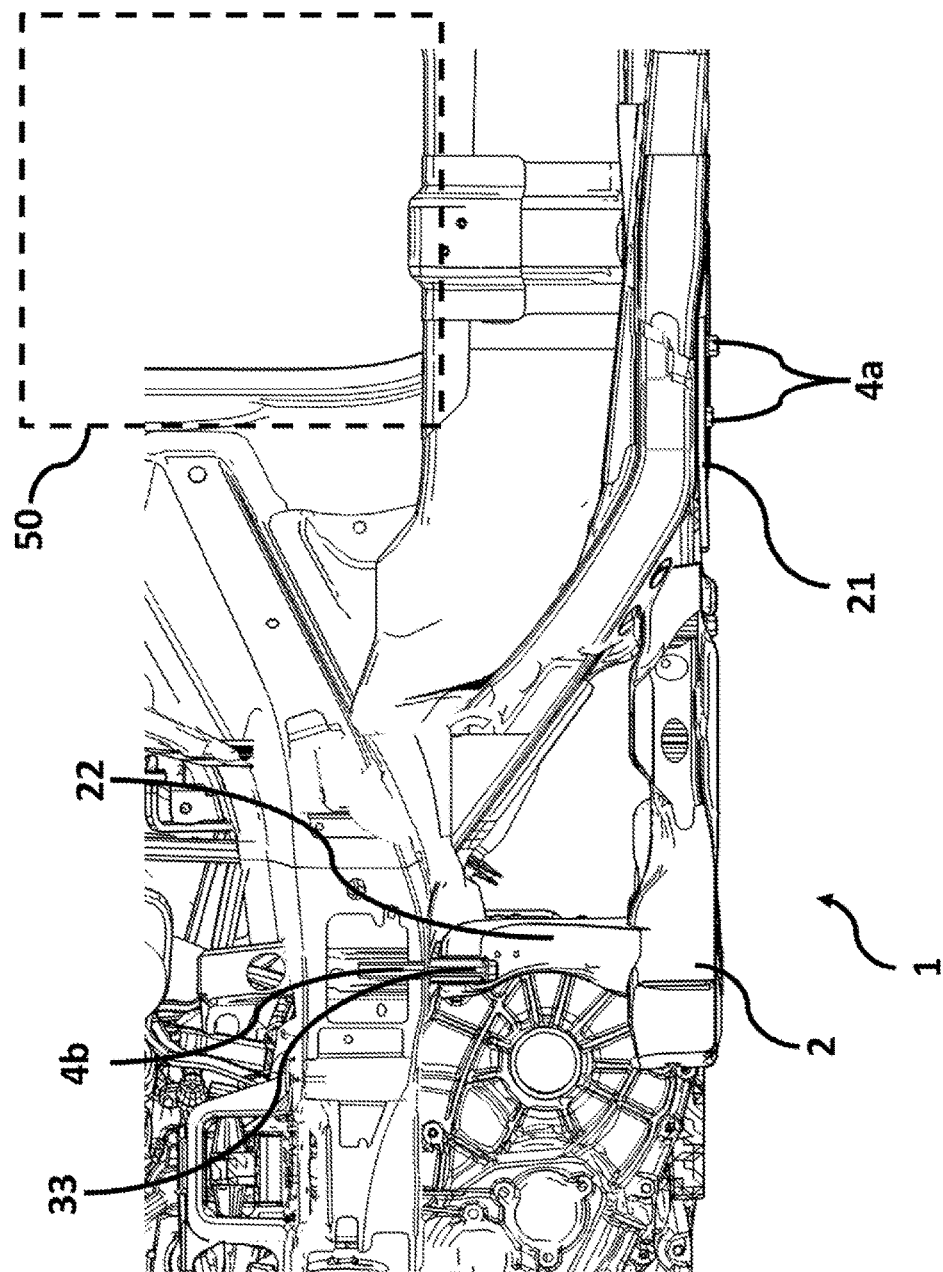
FIG. 7 illustrates one embodiment of the sub-frame arrangement comprising the sub-frame, fastening means, and body members, wherein the arrangement is arranged in a vehicle.

FIG. 7 illustrates one embodiment wherein the sub-frame arrangement 1 is shown from a side view wherein the details of the sub-frame 2 is further illustrated. The sub-frame 2 is retained in the front section 31 by front fastening means 4a that are passing through a fastening socket 33 creating an engagement between the sub-frame 2 and the body members 3a and 3b. The sub-frame 2 is further attached to the vehicle in its rear section 32 by the rear fastening means 4b passing through the sub-frame 2, in more detail passing through the rear portions 21, and engaging with the body of the vehicle.

Figure 8:
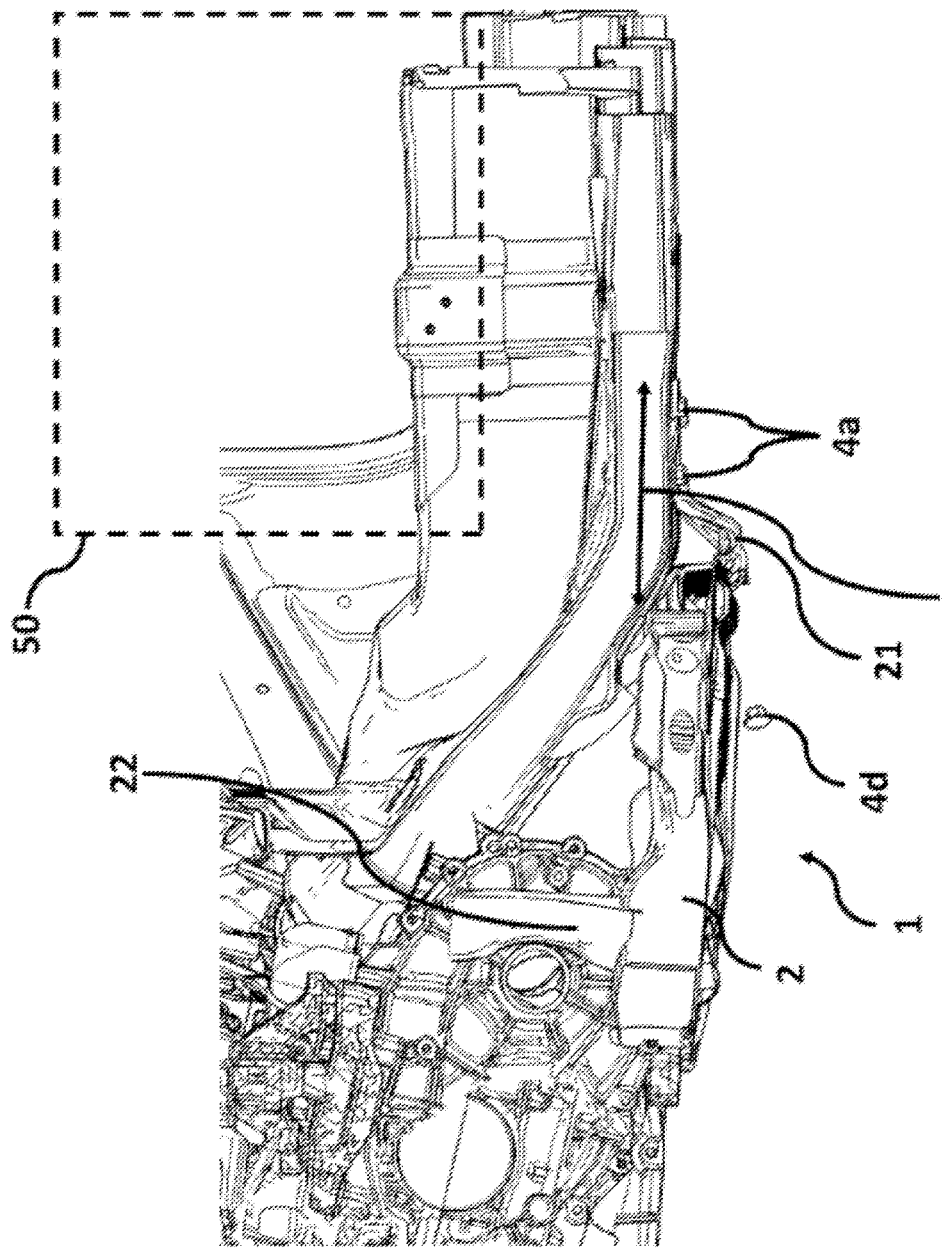
FIG. 8 illustrates one embodiment of the sub-frame arrangement after deformation caused by a collision.

FIG. 8 illustrates one embodiment of the sub-frame arrangement wherein the rear portions 21 have deformed directing the sub-frame under the passenger cell 50. In one embodiment the front fastening means 4b are left in the body members 3a and 3b of the vehicle while the attachment socket 33 opens up and releases the front section 31 of the sub-frame.

Figure 9:
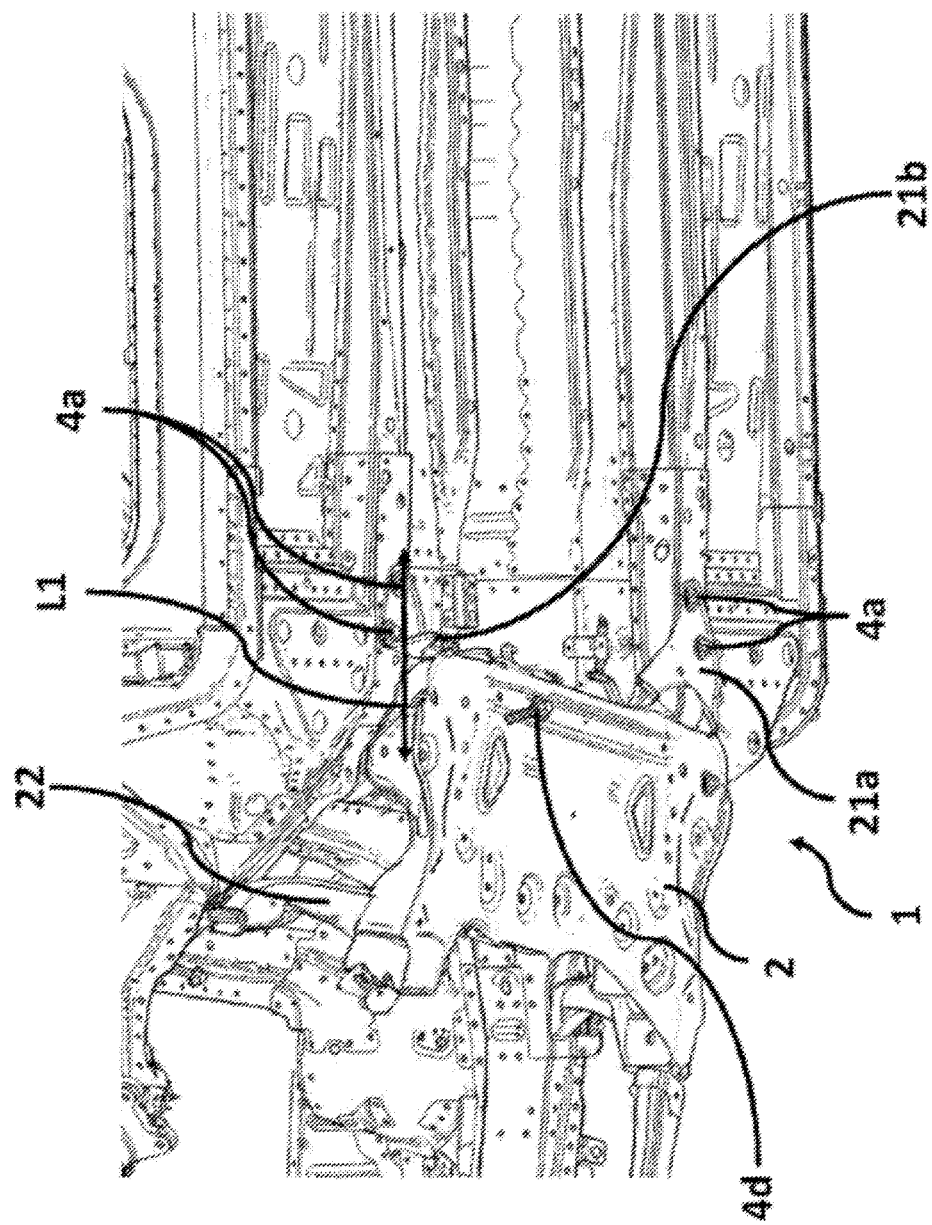
FIG. 9 illustrate one embodiment of the sub-frame arrangement during a moderate overlap collision.

FIG. 9 illustrates one embodiment of the sub-frame arrangement 1 wherein a moderate overlap collision has occurred deforming the sub-frame 2 more on the left side than on the right side of the vehicle. The rear portions 21 has deformed differently wherein the first rear portion 21a has deformed in a way restraining the rotation force of the deformation while the second rear portion 21b has deformed absorbing a large amount of longitudinal force from the collision.

Depending of the collision direction, force, and collision area of the vehicle the force that shall be absorbed and the deformation distance L1 that shall not be exceeded differs. For example, during absorption of collision force from a full front collision, it is beneficial to maximize the deformation distance L1. This is in one embodiment of the sub-frame arrangement 1 conducted through slightly decreasing the energy absorption capacity per length unit for full front collisions. The lost energy absorption per length unit is compensated for by a longer deformation distance L1. This has a beneficial impact on the safety performance of the vehicle.

According to one embodiment the rear portions 21 are deformed to the point where the rear portions 21 retains the sub-frame 2 from moving further backwards, this occurs when the rear portions 21 reaches their deformation end point.

What is claimed is:
1. A sub-frame arrangement in a vehicle, said sub-frame arrangement comprising:
   a sub-frame;
   a first body member; and
   rear fastening means for attaching said sub-frame to the first body member,
   wherein said sub-frame is a dual part sub-frame comprising a top section and a substantially flat lower sheet section,
   wherein said lower sheet section is formed in a single piece and extends the entire length of said sub-frame, wherein said lower sheet section further is formed with two rear portions each extending backwards in the travel direction of said vehicle and adapted to deform during a collision, wherein said rear portions are adapted to host the rear fastening means, wherein the rear portions of the lower sheet section are adapted to deform in a direction downwards and backwards in relation to the travel direction of the vehicle during a collision, allowing the sub-frame to be directed under a passenger cell of the vehicle, characterized in that said sub-frame arrangement further comprises a release attachment means adapted to release the sub-frame during said deformation, and wherein the rear fastening means are adapted to retain the sub-frame during said deformation.

2. The sub-frame arrangement according to claim 1, wherein said top section comprises two towers.

3. The sub-frame arrangement according to claim 2, wherein the rear portions are adapted to deform and the rear fastening means are adapted to retain an engagement between the rear portion of the sub-frame and the first body member during the entire deformation caused by a collision.

4. The sub-frame arrangement according to claim 3, wherein a first rear portion is adapted to deform differently from a second rear portion in order to allow a shorter deformation distance during a moderate overlap collision than during a full front collision.

5. The sub-frame arrangement according to claim 4, wherein said sub-frame arrangement further comprises a second body member and front fastening means adapted to fasten a front section of said sub-frame to the second body member.

6. The sub-frame arrangement according to claim 5, wherein said lower sheet section has a substantially flat shape formed from a single piece of any one of sheet metal and aluminum.

7. The sub-frame arrangement according to claim 1, wherein the rear portions are adapted to deform and the rear fastening means are adapted to retain an engagement between the rear portion of the sub-frame and the first body member during the entire deformation caused by a collision.

8. The sub-frame arrangement according to claim 1, wherein a first rear portion is adapted to deform differently from a second rear portion in order to allow a shorter deformation distance during a moderate overlap collision than during a full front collision.

9. The sub-frame arrangement according to claim 1, wherein at least one of said rear portions is adapted to deform over a second length longer than a first length corresponding to the distance between the release attachment means and the rear fastening means, allowing the rear portion to absorb additional force through limiting the sub-frame movement in the deformation direction.

10. The sub-frame arrangement according to claim 1, wherein said sub-frame arrangement further comprises a second body member and front fastening means adapted to fasten a front section of said sub-frame to the second body member.

11. The sub-frame arrangement according to claim 10, wherein said front fastening means are adapted to release the sub-frame from engagement with the second body member during deformation caused by a collision.

12. The sub-frame arrangement according to claim 1, wherein said lower sheet section is formed from a single piece of any one of sheet metal and aluminum.

13. A vehicle comprising a sub-frame arrangement, said sub-frame arrangement comprising:

a sub-frame;

a first body member; and rear fastening means for attaching said sub-frame to the first body member, wherein said sub-frame is a dual part sub-frame comprising a top section and a substantially flat lower sheet section, wherein said lower sheet section is formed in a single piece and extends the entire length of said sub-frame, wherein said lower sheet section further is formed with two rear portions each extending backwards in the travel direction of said vehicle and adapted to deform during a collision, wherein said rear portions are adapted to host the rear fastening means, wherein the rear portions of the lower sheet section are adapted to deform in a direction downwards and backwards in relation to the travel direction of the vehicle during a collision, allowing the sub-frame to be directed under a passenger cell of the vehicle, characterized in that said sub-frame arrangement further comprises a release attachment means adapted to release the sub-frame during said deformation, and wherein the rear fastening means are adapted to retain the sub-frame during said deformation.

* * * * *